(12) United States Patent
Okuyama et al.

(10) Patent No.: US 10,383,153 B2
(45) Date of Patent: Aug. 13, 2019

(54) BASE STATION

(71) Applicant: NTT DOCOMO, INC., Tokyo (JP)

(72) Inventors: Tatsuki Okuyama, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/774,719

(22) PCT Filed: Feb. 21, 2017

(86) PCT No.: PCT/JP2017/006377
§ 371 (c)(1),
(2) Date: May 9, 2018

(87) PCT Pub. No.: WO2017/154558
PCT Pub. Date: Sep. 14, 2017

(65) Prior Publication Data
US 2018/0332623 A1    Nov. 15, 2018

(30) Foreign Application Priority Data

Mar. 11, 2016   (JP) .................. 2016-048756

(51) Int. Cl.
*H04W 74/08* (2009.01)
*H04W 16/28* (2009.01)
*H04W 72/04* (2009.01)

(52) U.S. Cl.
CPC ....... *H04W 74/0833* (2013.01); *H04W 16/28* (2013.01); *H04W 72/046* (2013.01)

(58) Field of Classification Search
CPC .......... H04W 74/0833; H04W 74/008; H04W 8/005; H04W 28/06; H04W 36/0072; H04W 56/00; H04W 56/001
See application file for complete search history.

(56) References Cited

U.S. PATENT DOCUMENTS

| | | | |
|---|---|---|---|
| 8,098,745 B2 * | 1/2012 | Bertrand | H04J 13/00 |
| | | | 375/130 |
| 2018/0131481 A1 * | 5/2018 | Jiang | H04J 13/0059 |

OTHER PUBLICATIONS

International Search Report issued in PCT/JP2017/006377 dated Mar. 21, 2017 (3 pages).

(Continued)

*Primary Examiner* — Sai Aung
(74) *Attorney, Agent, or Firm* — Osha Liang LLP

(57) ABSTRACT

There is provided a base station of a radio communication system including the base station and one or more mobile stations that communicate with the base station, including a receiver that receives, from each of the one or more mobile stations, a signal of a specific random access sequence of random access sequences; and an identifier that identifies the specific random access sequence of the random access sequences and a receiving direction in which the signal of the specific random access sequence is received, based on absolute values of total values, each of the total values being obtained by calculating correlation values for combinations between signals in respective reception directions to which weights corresponding to the reception directions are applied and the random access sequences, and by adding the correlation values for the combinations corresponding to one random access sequence of the random access sequences.

7 Claims, 15 Drawing Sheets

APPROPRIATE BEAM SELECTION
(BEAM FORMING)

RACH
TRANSMISSION

(56) References Cited

OTHER PUBLICATIONS

Written Opinion of the International Searching Authority issued in PCT/JP2017/006377 dated Mar. 21, 2017 (3 pages).
NTT DOCOMO, Inc.; "5G Radio Access: Requirements, Concept and Technologies"; DOCOMO 5G White Paper, Sep. 2014 (27 pages).

* cited by examiner

BASE STATION OF RELATED ART

MASSIVE MIMO BASE STATION

UNIFORM PLANAR ARRAY (UPA)

BASE STATION

TECHNICAL FIELD

The present invention relates to a base station.

BACKGROUND ART

In Long Term Evolution (LTE), in order to further increase a system capacity, further increase data a transmission rate, and further reduce latency in a radio section, a radio communication scheme called 5G has been studied. In 5G, various element techniques have been studied in order to satisfy requirements that latency in a radio section be less than or equal to 1 ms while achieving throughput of 10 Gbps or more.

In 5G, a higher frequency band than that of LTE is assumed to be used. Here, since a propagation loss increases in a high frequency band, the application of massive Multi Input Multi Output (MIMO) in which beam forming with a narrow beam width is performed has been studied to compensate for it. Massive MIMO is a large-scale MIMO in which a plurality of antenna elements (for example, 100 elements) are installed at a base station side, and it is possible to reduce interference between users since it is possible to concentrate an electric field strength in a narrow region.

FIG. 1A illustrates an example of beam forming performed by a base station according to a related art such as LTE, and FIG. 1B illustrates an example of beam forming performed by a base station using massive MIMO. In massive MIMO, as illustrated in FIG. 1B, it is possible to transmit radio signals far away through beam forming with a narrow beam width.

PRIOR ART DOCUMENT

Non-Patent Document

Non-Patent Document 1: NTT DOCOMO, Inc. "DOCOMO 5G White Paper," September 2014

SUMMARY OF THE INVENTION

Problem to be Solved by the Invention

Currently, as a basic architecture of 5G, a scenario has been proposed in which a macro cell is overlaid with small cells formed by a massive MIMO base station, and transmission and reception of control signals of a higher layer (radio resource control (RRC) or the like) or low speed user data are performed at the macro cell side, and transmission and reception of high speed data is performed in the small cell. In this scenario, when a radio link is initially established, the mobile station performs a random access procedure with the base station of the macro cell.

However, in the future, scenarios are also assumed such that transmission and reception of control signals are performed at the small cell side or communication is performed only by small cells. In order to implement these scenarios, a technique for implementing the random access procedure directly between the mobile station and the massive MIMO base station is required.

In the random access procedure, as illustrated in FIG. 2, it is desirable for the massive MIMO base station to perform beam forming in an arrival direction of a random access channel (RACH) signal received from the mobile station and then specify a sequence of the RACH signal. However, it is difficult for the massive MIMO base station to detect the channel information with the mobile station before the RACH signal is received from the mobile station, and thus it is unable to perform beam forming in the arrival direction of the RACH signal in advance. This problem is not limited to massive MIMO base station and can occur in general base stations that perform beam forming.

The disclosed technology has been developed in light of the forgoing, and an object is to provide a technique capable of specifying a sequence of a RACH signal and specifying a reception direction of the RACH signal in a random access procedure.

Means for Solving Problem

A base station according to the disclosed technology is a base station of a radio communication system including the base station and one or more mobile stations that communicate with the base station, the base station including a receiver that receives, from each of the one or more mobile stations, a signal of a specific random access sequence of a plurality of random access sequences; and an identifier that identifies the specific random access sequence of the plurality of random access sequences and a receiving direction in which the signal of the specific random access sequence is received, based on absolute values of a plurality of total values, each of the plurality of total values being obtained by calculating correlation values for combinations between signals in a respective plurality of reception directions to which weights corresponding to the plurality of reception directions are applied and the plurality of random access sequences, and by adding the correlation values for the combinations corresponding to one random access sequence of the plurality of random access sequences.

Effect of the Invention

According to the disclosed technology, a technique is provided that allows a sequence of a RACH signal and a reception direction of the RACH signal to be specified in the random access procedure.

EMBODIMENTS OF THE INVENTION

In the following, an exemplary embodiment of the present invention is described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE or 5G, but the present invention is not limited to LTE or 5G but can be applied to other schemes.

<System Configuration>

Figure 1A:
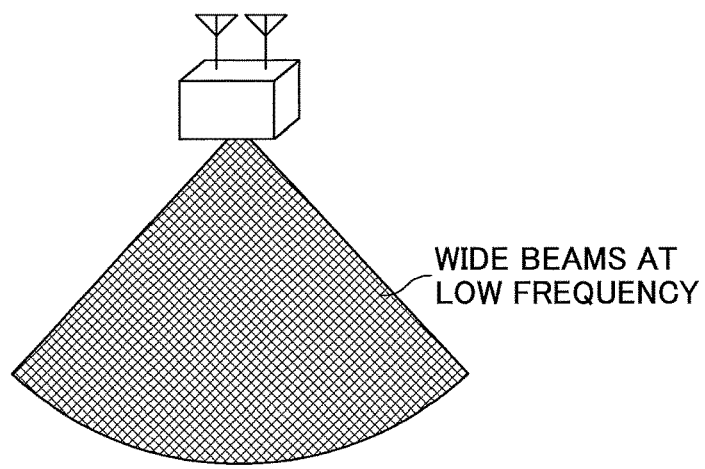
FIG. 1A is a diagram illustrating an example of beam forming.
Figure 1B:
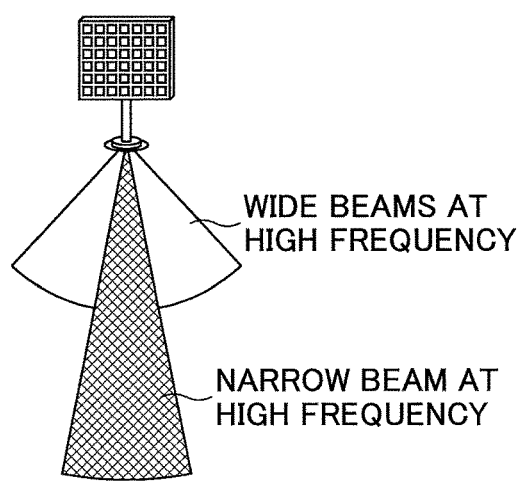
FIG. 1B is a diagram illustrating an example of the beam forming.
Figure 2:
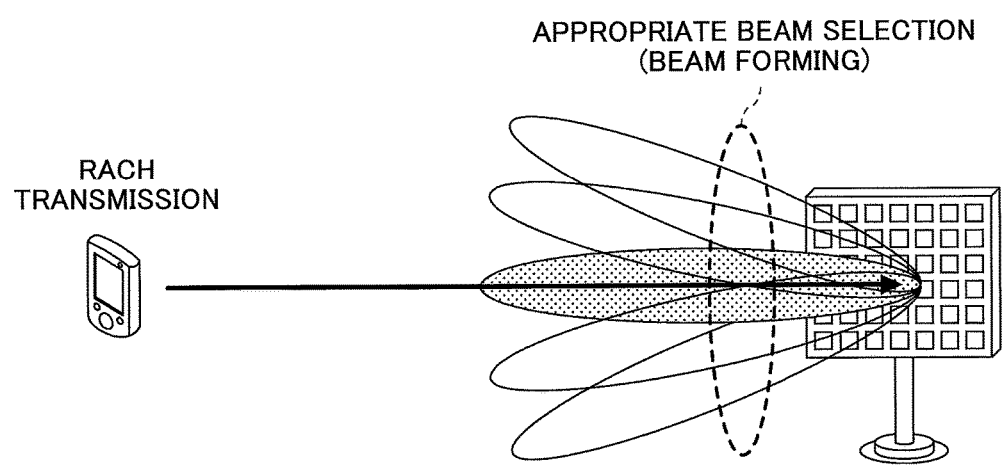
FIG. 2 is a diagram for describing a problem.
Figure 3:
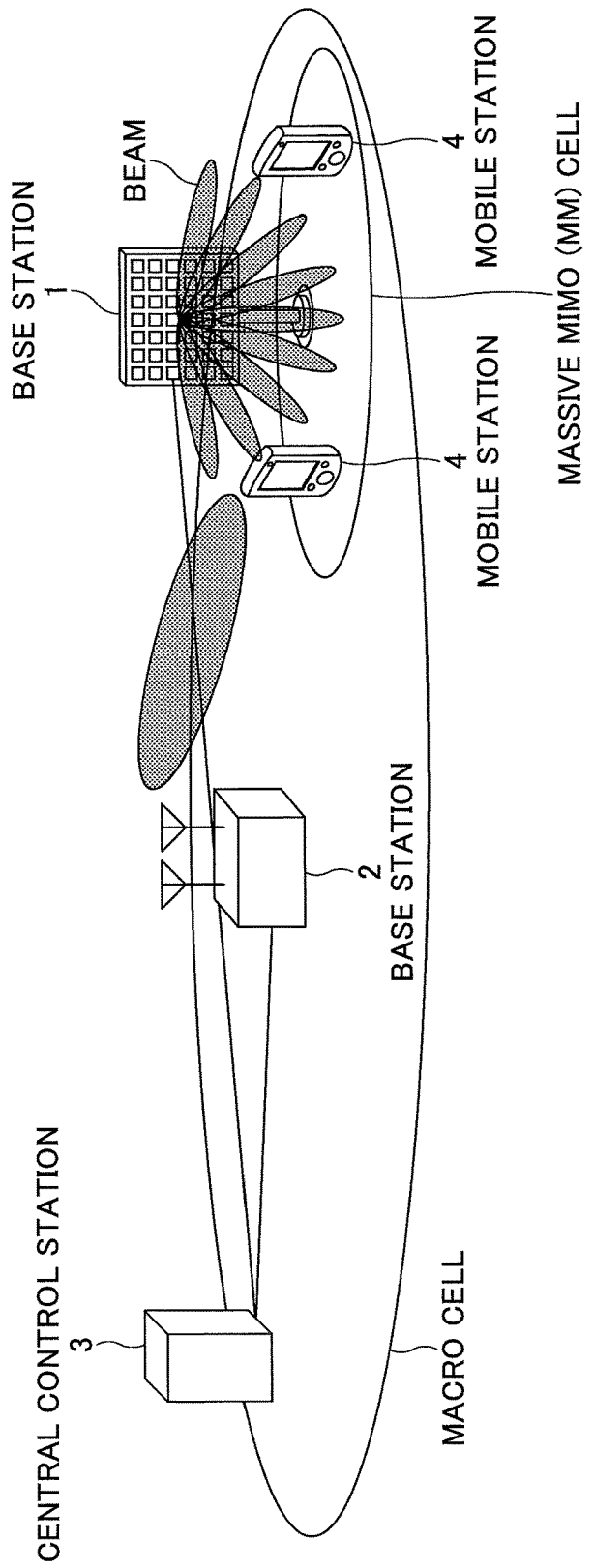
FIG. 3 is a diagram illustrating an exemplary configuration of a radio communication system according to an embodiment.

FIG. 3 is a diagram illustrating an exemplary configuration of a radio communication system according to an embodiment. The radio communication system according to the embodiment includes a base station 1 that supports massive MIMO, a base station 2 that forms a macro cell, a central control station 3, and a mobile station 4. The base station 1 includes a plurality of antenna elements and forms a massive MIMO cell (MM cell). The MM cell indicates a cell formed by a plurality of beams transmitted from the base station 1. In the MM cell, for example, it is possible to realize higher speed communication than in a macro cell, for example, using a band having a bandwidth of 100 MHz or higher at 5G Hz or higher.

The base station 2 forms a macro cell with a larger coverage than the MM cell. The macro cell is assumed to be a cell of LTE (including LTE-advanced (LTE-A), but the macro cell is not limited thereto and may be a cell using a radio technique other than LTE such as a wireless LAN. In other words, in the present embodiment, cells of LTE or, cells of the wireless LAN, or the like are arranged to overlap the MM cell.

The central control station 3 has a function for centrally controlling the base station 1 and the base station 2. For example, the central control station 3 performs scheduling of radio resources possessed by the base station 1 and base station 2, control of a higher layer (for example, a RRC layer or the like), and the like.

The mobile station 4 has a function for communicating with base station 1 or base station 2. Two or more mobile stations 4 may be provided in the present embodiment. Further, the mobile station 4 has a function for performing the random access procedure with the base station 1 when communication is initiated. The mobile station 4 may have a function for communicating with either of the base station 1 and the base station 2 or may have a function (multiple connectivity) of simultaneously performing communication with the base station 1 and the base station 2.

In usual LTE, the mobile station 4 performs the random access procedure when establishing a radio link with the base station 2 of the macro cell. The mobile station 4 initiates the random access procedure by transmitting a signal of a RACH sequence which is randomly selected from a plurality of RACH sequence candidates which are prepared in a cell in advance (also referred to as a "random access preamble" or a "message 1") to the base station 2.

Similar to usual LTE, the present embodiment also assumes that when establishing a radio link with the base station 1, the mobile station 4 transmits a signal of a RACH sequence which is randomly selected from a plurality of RACH sequence candidates which are prepared in the MM cell in advance (hereinafter, referred to as a "RACH signal") to the base station 1.

The present embodiment can be applied to the radio communication system in which communication is performed in the MM cell alone (for example, a radio communication system having only the base station 1) in addition to the radio communication system in which the macro cell and the MM cell overlap as illustrated in FIG. 3.

<Functional Configuration>

Figure 4:
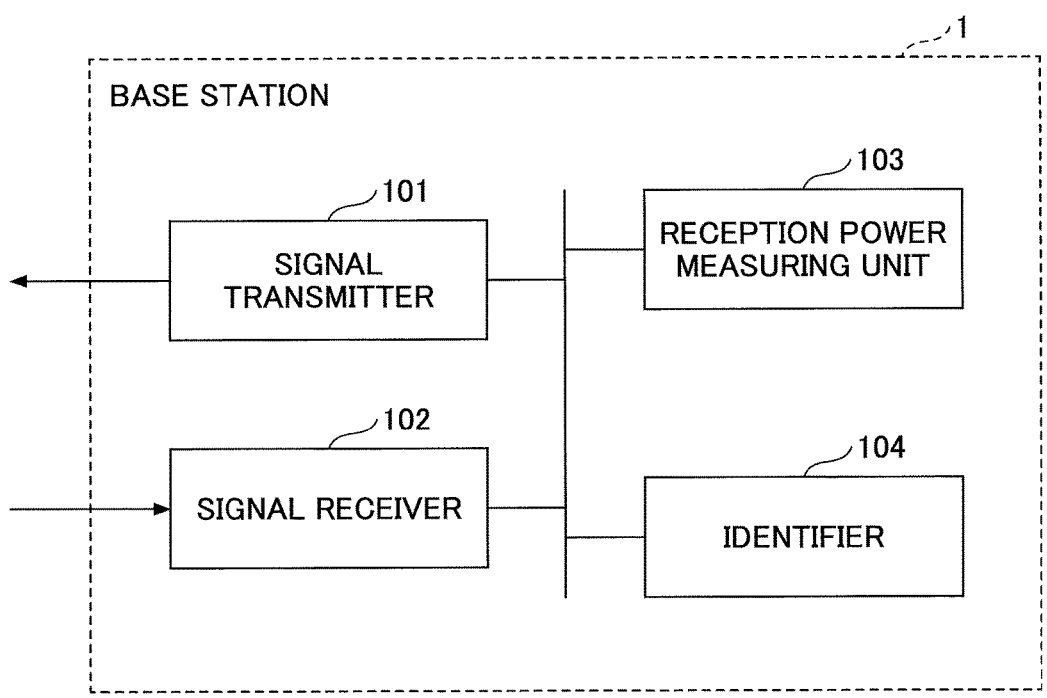
FIG. 4 illustrates an exemplary functional configuration of a base station according to an embodiment.

FIG. 4 is a diagram illustrating an exemplary functional configuration of the base station according to an embodiment. As illustrated in FIG. 4, the base station 1 includes a signal transmitter 101, a signal receiver 102, a reception power measuring unit 103, and an identifier 104. FIG. 4 illustrates only main function units in the present embodiment, and functions (not illustrated) of performing operations conforming to a communication scheme used in the present radio communication system are also provided. However, some of processes of the base station 1 (for example, a specific one embodiment, a modified example, or the like) to be described later may be able to be performed.

The signal transmitter 101 has a function for generating a signal of a physical layer from a signal of a higher layer to be transmitted from the base station 1 and wirelessly transmitting the generated signal. Further, the signal transmitter 101 has a function for wirelessly transmitting a signal in a specific direction by performing beam forming (transmission beam forming). The signal receiver 102 has a function for receiving a signal of the physical layer from the mobile station 4 and acquiring a signal of the higher layer from the received signal. The signal receiver 102 has a function for directing a beam in a specific direction by performing beam forming (reception beam forming) and receiving a signal. Further, the signal receiver 102 has a function for storing the received signal in a storage unit such as a memory.

The reception power measuring unit 103 has a function for measuring reception power of the signal received by the signal receiver 102. Further, the reception power measuring unit 103 has a function for measuring reception power of a signal received in a specific direction by beam forming.

The identifier 104 has a function for specifying a RACH sequence of a RACH signal received from the mobile station 4 and the reception direction of the RACH signal. Further, the identifier 104 has a function for identifying a specific RACH sequence and a receiving direction in which the specific RACH sequence is received, based on absolute values of a plurality of total values, each of the plurality of total values being obtained by calculating correlation values for combinations between signals received in respective receiving directions by the beam forming and the plurality of RACH sequences, and by adding the correlation values for the combinations corresponding to one RACH sequence of the plurality of RACH sequences.

The entire functional configuration of the base station 1 described above may be implemented by a hardware circuit (for example, one or a plurality of IC chips), or a part of the functional configuration may be formed of a hardware circuit, and the remaining parts may be implemented by a CPU and a program.

Figure 5:
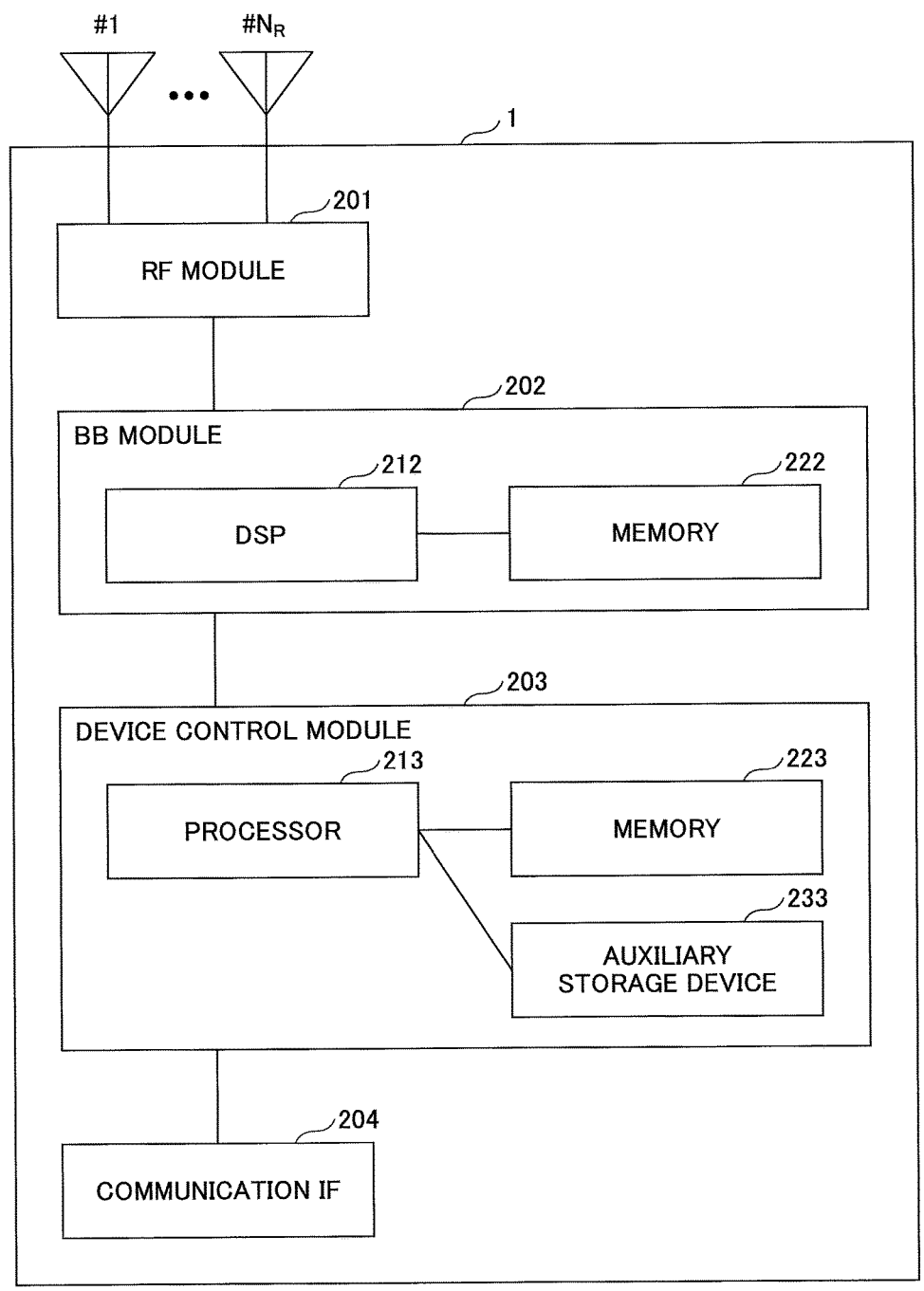
FIG. 5 is a diagram illustrating an exemplary hardware configuration of a base station according to an embodiment.

FIG. 5 is a diagram illustrating an example of the hardware configuration of the base station according to the embodiment. FIG. 5 illustrates a configuration that is closer to an implementation example than that of FIG. 4. As illustrated in FIG. 5, the base station 1 includes a radio frequency (RF) module 201 that performs processing related to a radio signal, a baseband (BB) processing module 202 that performs baseband signal processing, a device control module 203 that performs processing of the higher layer and the like, and a communication IF 204 which is an interface for a connection with a network.

The RF module 201 performs digital-to-analog (D/A) conversion, modulation, frequency transform, power amplification, and the like on a digital baseband signal received from the BB processing module 202 and generates a radio signal to be transmitted through an antenna. Further, the RF module 301 performs frequency transform, analog to digital (A/D) conversion, demodulation, and the like on a received radio signal, generates a digital baseband signal, and transfers the digital baseband signal to the BB processing module 202. The RF module 201 includes, for example, a part of the signal transmitter 101 and a part of the signal receiver 102 illustrated in FIG. 4.

The BB processing module 202 performs a process of converting an IP packet into a digital baseband signal and vice versa. A digital signal processor (DSP) 212 is a processor that performs signal processing in the BB processing module 202. A memory 222 is used as a work area of the DSP 212. The BB processing module 202 includes, for example, a part of the signal transmitter 101, a part of the signal receiver 102, the reception power measuring unit 103, and the identifier 104 illustrated in FIG. 4.

The device control module 203 performs protocol processing of the IP layer, operation and maintenance (OAM) processing, and the like. A processor 213 is a processor that performs processing performed by the device control module 203. A memory 223 is used as a work area of the processor 213. An auxiliary storage device 233 is, for example, an HDD or the like, and stores various kinds of configuration information and the like for an operation of the base station 1.

<Processing Procedure>

Next, a specific processing procedure when the base station 1 specifies the RACH sequence of the RACH signal received from the mobile station 4 and specifies the reception direction of the RACH signal (a direction of a beam in which the RACH signal is received) is described.

In the present embodiment, the signal receiver 102 of the base station 1 stores the RACH signal received from the mobile station 4 in a storage unit such as a memory. The identifier 104 of the base station 1 performs digital signal processing such as beam forming on the RACH signal temporarily stored in the storage unit, and specifies the RACH sequence and the reception direction of the RACH signal.

Figure 6:
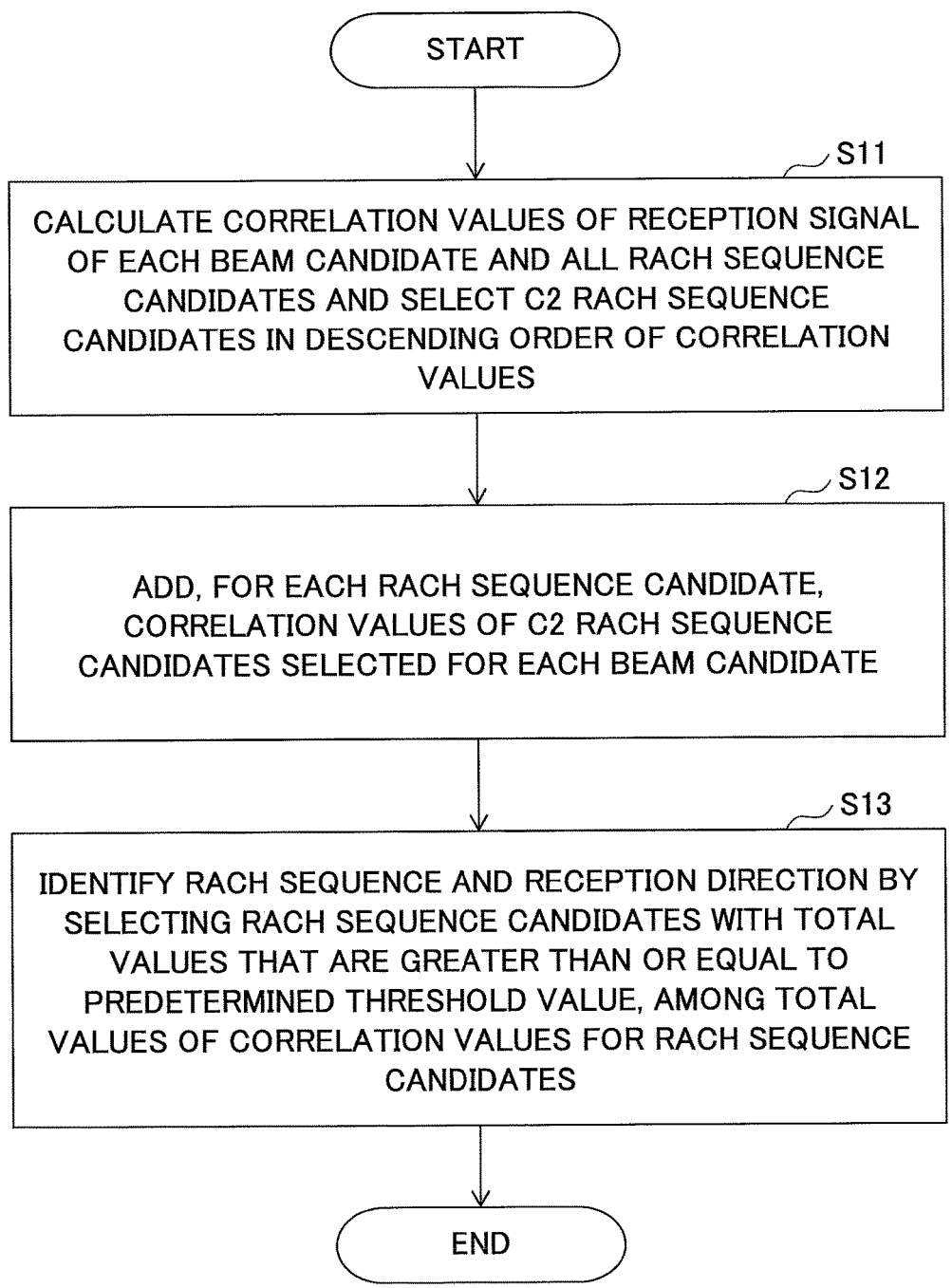
FIG. 6 is a flowchart illustrating an example of a processing procedure of specifying a RACH sequence and a reception direction.

FIG. 6 is a flowchart illustrating an example of a processing procedure of specifying the RACH sequence and the reception direction. In the following description, the number of RACH sequence candidates that can be selected by the mobile station 4 in the MM cell is assumed to be "C1."

In step S11, the identifier 104 performs the beam forming on the RACH signal by multiplying the RACH signal received by the signal receiver 102 by a weight (W) corresponding to each of C0 beam candidates (directions in which the reception beam forming is performed). The weight (W) corresponding to the beam candidate is a weight amount by which the RACH signal received by each of all antenna elements of the base station 1 is multiplied and is also referred to as a "steering vector."

Figure 7A:
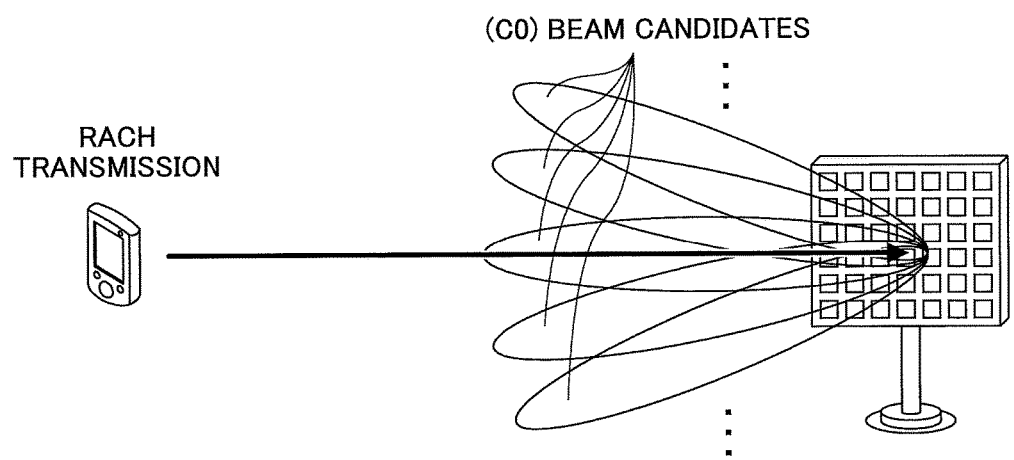
FIG. 7A is a diagram illustrating beam candidates.
Figure 7B:
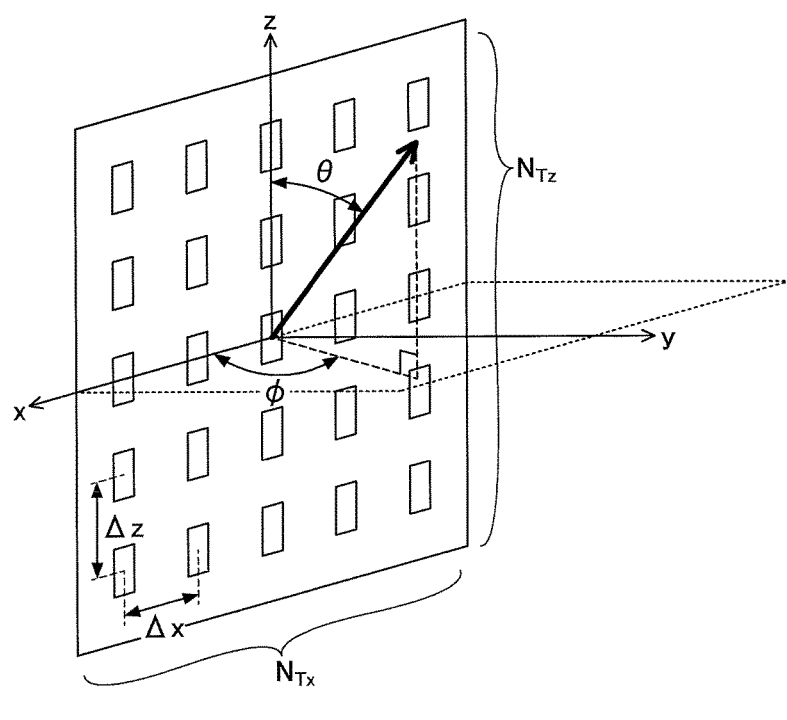
FIG. 7B is a diagram illustrating a beam angle in an xy plane and a beam angle in a yz plane.

FIG. 7A illustrates an example of C0 beam candidates. In the present embodiment, although a direction of each beam candidate and the number of beam candidates are optional, but for example, beam candidates may be discretely provided at angles having predetermined intervals in the horizontal direction and the vertical direction from the antenna surface. FIG. 7B illustrates a beam angle ($\phi$) in an xy plane (with respect to the antenna plane in the horizontal direction) and a beam angle ($\theta$) in a yz plane (with respect to the antenna plane in the vertical direction). For example, $\phi=0°$ to 180° and $\theta=0°$ to 180° may be set, and beam candidates may be discretely provided at intervals of 10° in directions of $\phi$ and $\theta$. In this case, the number of beam candidates is 18×18=324 (C0=324). Further, for example, $\phi=0°$ to 180° and $\theta=0°$ to 180° may be set, and beam candidates may be discretely provided at intervals of 5° in directions of $\phi$ and $\theta$. In this case, the number of beam candidates is 36×36=1296 (C0=1296).

Then, the identifier 104 calculates a correlation value ($\rho$) for each of combinations of the RACH signals of the C0 beam candidates (the RACH signals multiplied by the weights corresponding to the beam candidates) and C1 RACH sequence candidates, and selects a predetermined number of RACH sequence candidates (C2 RACH sequence candidates) in the descending order of the correlation values for each beam candidate. A calculation of the correlation value between the RACH signal of the beam candidate and the RACH sequence candidate is a calculation of the correlation value between the RACH signal of the beam candidate and a replica signal of the RACH sequence candidate.

In step S12, the identifier 104 adds, for each RACH sequence candidate, the correlation values of the C2 RACH sequence candidates selected for each of the beam candidates.

In step S13, the identifier 104 identifies the RACH sequence received from the mobile station 4 by selecting a RACH sequence candidate having a sum value that is greater than or equal to a predetermined threshold value (X) among sum values of the correlation values for each of the RACH sequence candidates calculated in step S12. Note that, instead of selecting the RACH sequence candidate with the sum value that is greater than or equal to a predetermined threshold value (X), the identifier 104 may specify the RACH sequence received from the mobile station 4 by selecting a predetermined number of RACH sequence candidates in the descending order of the sum values.

Further, the identifier 104 identifies the beam candidate corresponding to each correlation value included in the sum value of the correlation values of the specified RACH sequence as the direction in which the RACH signal of the specified RACH sequence is received. For example, when a sum value of correlation values of a RACH sequence ($S_{30}$) is a value obtained by adding a correlation value between a beam candidate (10) and the RACH sequence ($S_{30}$) and a correlation value between a beam candidate (20) and the RACH sequence ($S_{30}$), the beam candidate (10) and the beam candidate (20) are specified as the direction in which the RACH signal of the RACH sequence ($S_{30}$) is received. Further, the identifier 104 may cause the beam candidate whose correlation value with the specified RACH sequence is a predetermined threshold value (Y) or less not to be included in the direction in which the RACH signal of the specified RACH sequence is received. For example, when the sum value of the correlation values of the RACH sequence ($S_{30}$) is a value obtained by adding the correlation value between the beam candidate (10) and the RACH sequence ($S_{30}$) and the correlation value between the beam candidate (20) and the RACH sequence ($S_{30}$), but the correlation value between the beam candidate (20) and the RACH sequence ($S_{30}$) is smaller than a predetermined threshold value (Y), only the beam candidate (10) is specified as the direction in which the RACH signal of the RACH sequence ($S_{30}$) is received. This is to prevent a beam candidate whose correlation value with the RACH sequence is low from being included in the direction in which the RACH signal is received.

Figure 8:
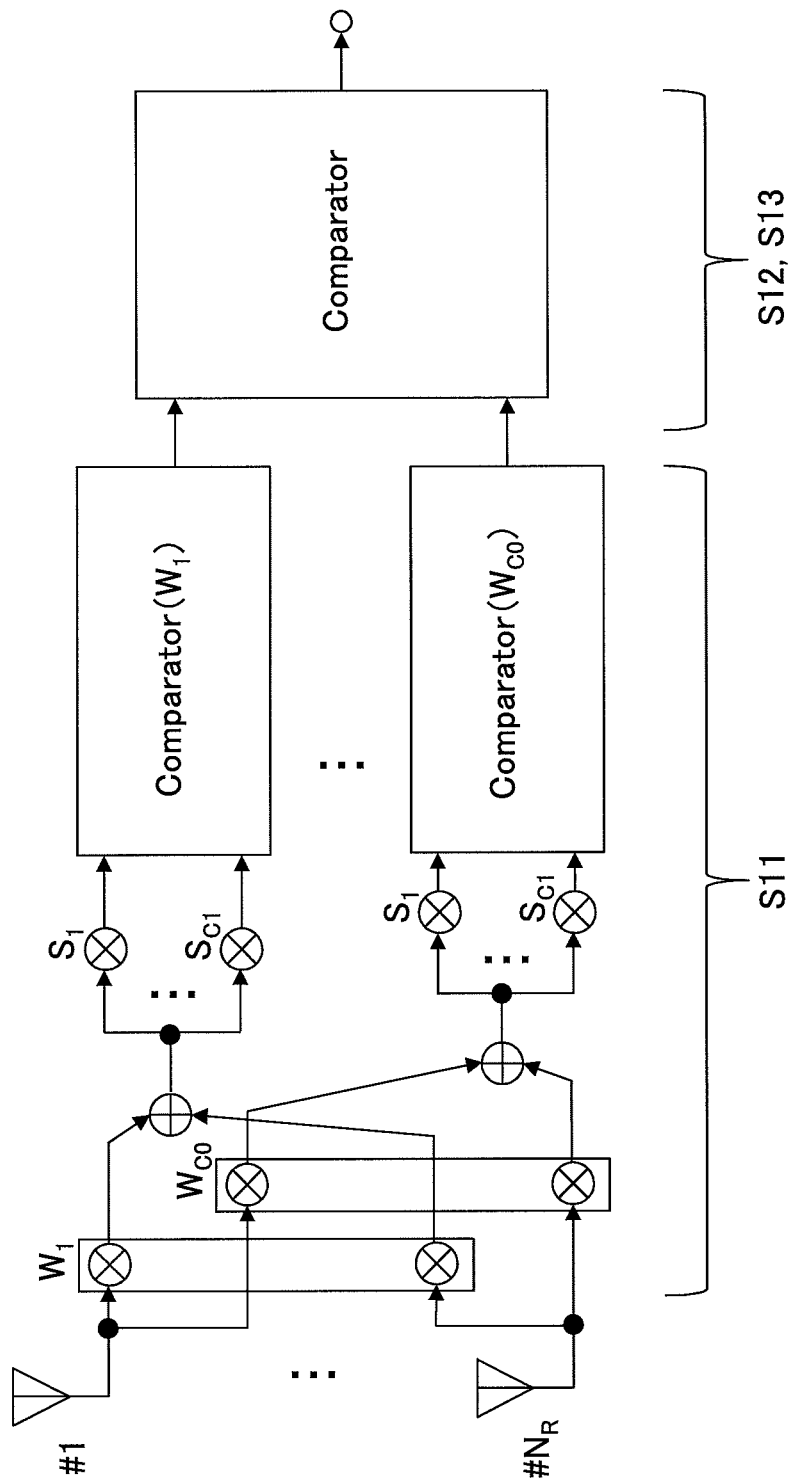
FIG. 8 is a diagram illustrating an example of a signal processing flow.

FIG. 8 illustrates an example of a signal processing flow corresponding to the processing procedure in steps S11 to S13 described above. The weights (W) corresponding to the C beam candidates described in step S11 correspond to $W_1$ to $W_{C0}$ of FIG. 8. The candidates of the C1 RACH sequences correspond to $S_1$ to $S_{C1}$ of FIG. 8.

Figure 9A:
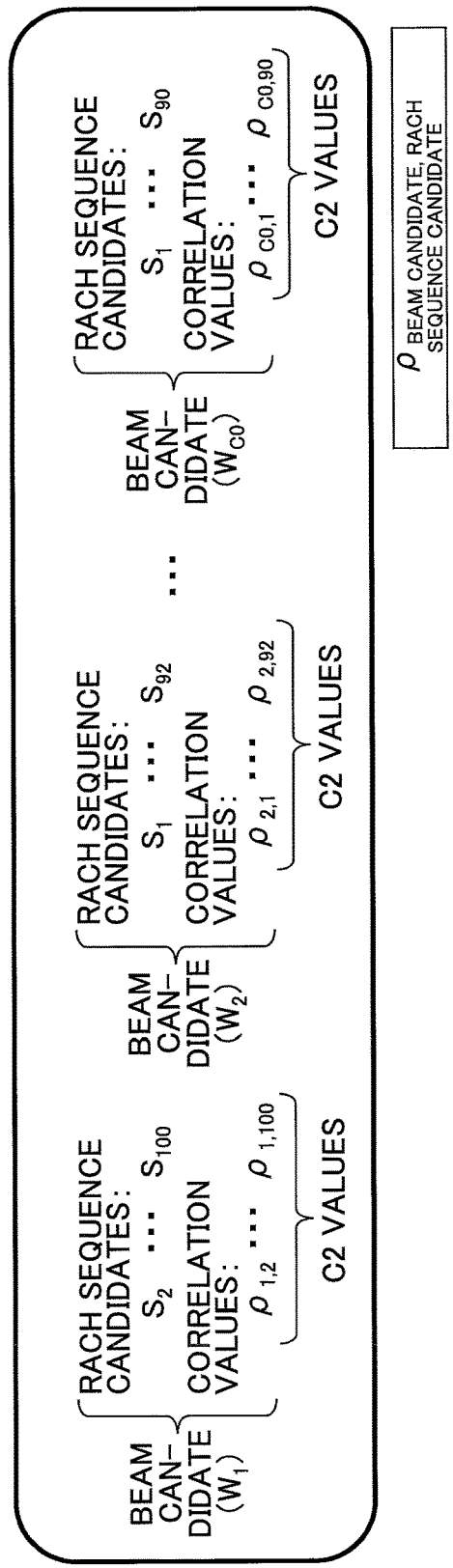
FIG. 9A is a diagram for describing a specific example of a processing procedure of specifying a RACH sequence and a reception direction.
Figure 9B:
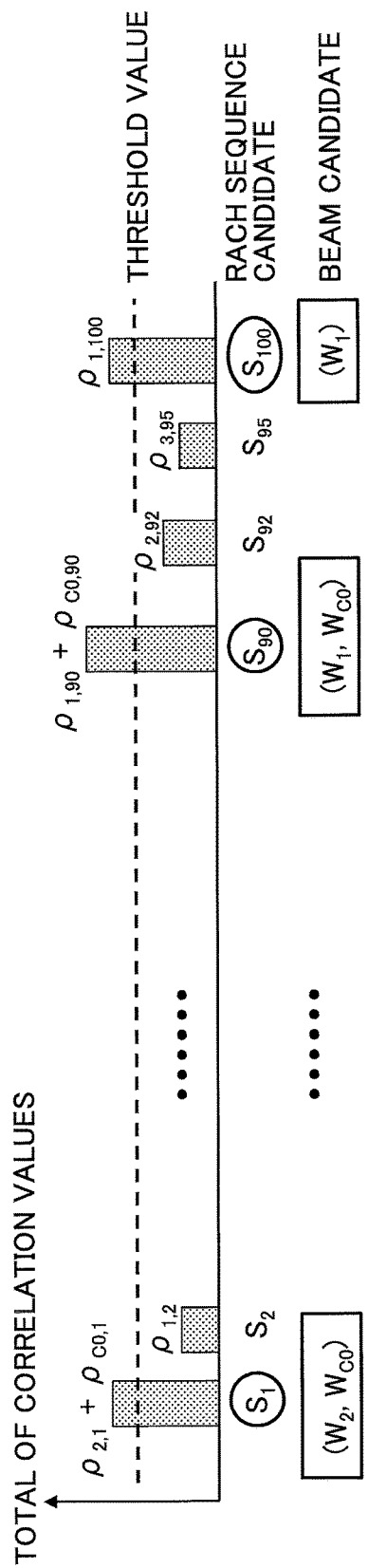
FIG. 9B is a diagram for describing the specific example of the processing procedure for specifying the RACH sequence and the reception direction.

Next, a specific example of the processing procedure of steps S11 to S13 is described with reference to FIG. 9A and FIG. 9B. In the example of FIG. 9A, the number of RACH sequence candidates is assumed to be 100 (C1=100), that is, $S_1$ to $S_{100}$. Further, in the example of FIG. 9A, in order to distinguish the beam candidates from each other, "beam candidates ($W_1$ to $W_{C0}$)" are indicated using the weights ($W_1$ to $W_{C0}$) corresponding to the beam candidates. Further, in the example of FIG. 9A, one or more RACH signals are assumed to be simultaneously transmitted from one or more mobile stations 4.

Through the processing procedure of step S11, as illustrated in FIG. 9A, C2 RACH sequence candidates (for example, 10 RACH sequence candidates) are selected in the descending order of the correlation values for each of the beam candidates $W_1$ to $W_{C0}$. For example, it is illustrated that for the beam candidate ($W_1$), $S_2$ to $S_{100}$ are selected as the C2 RACH sequence candidates, and the correlation values between the selected RACH sequence candidates and the RACH signal of the beam candidate ($W_1$) are $\rho_{1,2}$ to $\rho_{1,100}$. In FIG. 9A, the selected RACH sequence candidates are illustrated as "$S_2$ to $S_{100}$," but it is not intended that 99 RACH sequences $S_2$ to $S_{100}$ are selected, and it is intended that C2 RACH sequences are selected among the RACH sequences $S_2$ to $S_{100}$. For example, if C2=5 is assumed, it is intended that five RACH sequences $S_2$, $S_{25}$, $S_{55}$, $S_{90}$, and $S_{100}$ are selected.

Then, the correlation values corresponding to each RACH sequence candidate are added through the processing procedure of step S12. In the example of FIG. 9B, correlation values ($\rho_{2,1}$) and ($\rho_{C0,1}$) of the beam candidate ($W_2$) and the beam candidate ($W_{C0}$) having the high correlation value with the RACH sequence candidate ($S_1$) are added. The same applies to other RACH sequence candidates ($S_2$, ..., $S_{90}$, $S_{92}$, $S_{95}$, $S_{100}$).

Then, the RACH sequence candidate with a sum of the correlation values that is greater than or equal to a predetermined threshold value (X) is selected through the processing procedure of step S13. In the example of FIG. 9B, the RACH sequence candidates with a sum of the correlation values that is greater than or equal to a predetermined threshold value (X) are $S_1$, $S_{90}$, and $S_{100}$. Therefore, the identifier 104 identifies the three RACH sequence candidates ($S_1$, $S_{90}$, and $S_{100}$) as the RACH sequences received from a plurality of mobile stations 4.

Further, the correlation values of the beam candidate ($W_2$) and the beam candidate ($W_{C0}$) are added for the specified RACH sequence ($S_1$). Therefore, the identifier 104 identifies that the reception direction of the RACH signal which is the RACH sequence ($S_1$) is the direction of the beam candidate ($W_2$) and the beam candidate ($W_{C0}$). Similarly, for the specified RACH sequence ($S_{90}$), the correlation values of the beam candidate ($W_1$) and the beam candidate ($W_{C0}$) are added. Therefore, the identifier 104 identifies that the reception direction of the RACH signal which is the RACH sequence ($S_{90}$) is the direction of the beam candidate ($W_1$) and the beam candidate ($W_{C0}$). Further, for the specified RACH sequence ($S_{100}$), the correlation values of the beam candidate (W1) are added. Therefore, the identifier 104 identifies that the reception direction of the RACH signal which is the RACH sequence ($S_{100}$) is the direction of the beam candidate ($W_1$).

(First Modified Example)

In the processing procedure described above, the correlation values with all the RACH sequence candidates are calculated for all the beam candidates, and thus the amount of calculation becomes enormous. For example, when the number (C0) of beam candidates is 324, and the number (C1) of RACH sequence candidates is 100, it is necessary to calculate the correlation value for 32,400 combinations.

In this regard, in the first modified example, instead of calculating the correlation value with all the RACH sequence candidates for all the beam candidates, the correlation value with the RACH sequence candidate is calculated only for the beam candidates in which the reception power is high.

Figure 10:
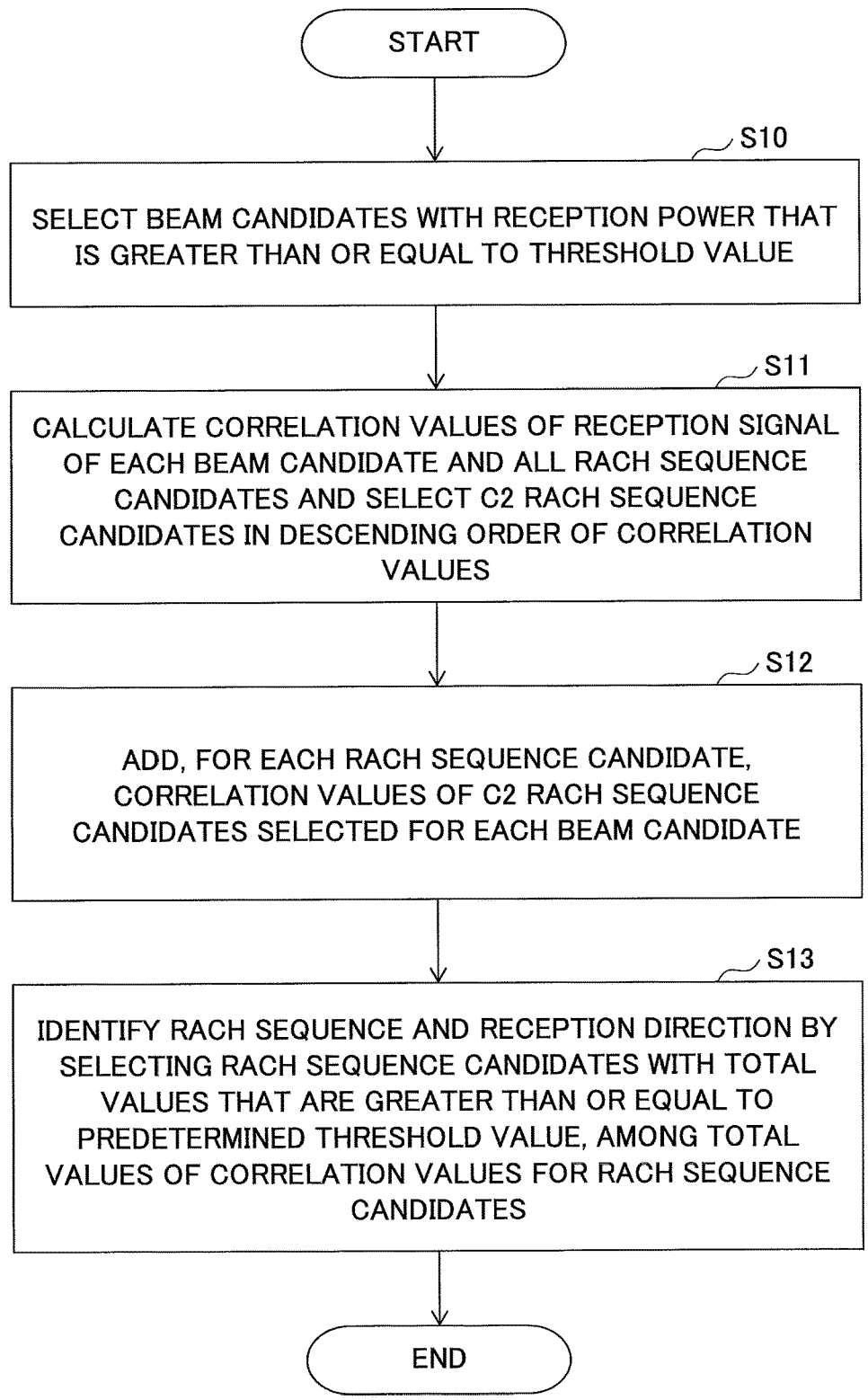
FIG. 10 is a flowchart illustrating an example of a processing procedure for specifying a RACH sequence and a reception direction (a first modified example)

FIG. 10 is a flowchart illustrating an example of a processing procedure of specifying the RACH sequence and the reception direction (a first modified example).

Figure 11:
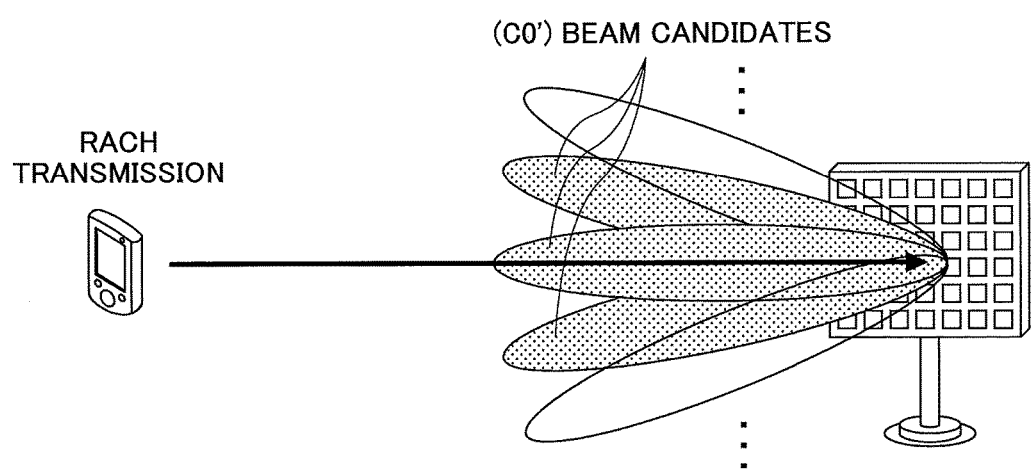
FIG. 11 is a diagram illustrating selected beam candidates.

In step S10, the reception power measuring unit 103 measures the reception power for each beam candidate. More specifically, the reception power measuring unit 103 multiplies the RACH signal received by the signal receiver 102 by the weight (W) corresponding to each of the C0 beam candidates (the directions in which the reception beam forming is performed), and measures the reception power of the RACH signal multiplied by the weight. Then, the reception power measuring unit 103 selects (C0') beam candidates with the reception power that is greater than or equal to a predetermined threshold value. FIG. 11 illustrates an example of the selected beam candidates.

Then, the identifier 104 performs the processing procedure of steps S11 to S13 on the (C0') beam candidates selected in the processing procedure of step S10. The processing procedure of steps S11 to S13 is the same as in FIG. 6, and thus description thereof is omitted.

According to the first modified example described above, it is possible to reduce the calculation amount in the process of specifying the RACH sequence and the reception direction of the RACH signal, and it is possible to rapidly specify the RACH sequence and the reception direction of the RACH signal.

(Second Modified Example)

In the processing procedure of step S11 of FIG. 6, the identifier 104 calculates the correlation value ($\rho$) of the RACH signal of each beam candidate and the C1 RACH sequence candidates, and calculates a predetermined number of RACH sequence candidates (C2 RACH sequence candidates) for each beam candidate in the descending order of the correlation values. On the other hand, in the second modified example, the identifier 104 finally selects a predetermined number of RACH sequence candidates by gradually narrowing down the RACH sequence candidates in the beam candidate order. In other words, in the processing procedure of step S11 of FIG. 6, the identifier 104 can perform the selection process in parallel for each beam candidate, but in the second modified example, the identifier 104 sequentially performs the selection process for each beam candidate.

Figure 12:
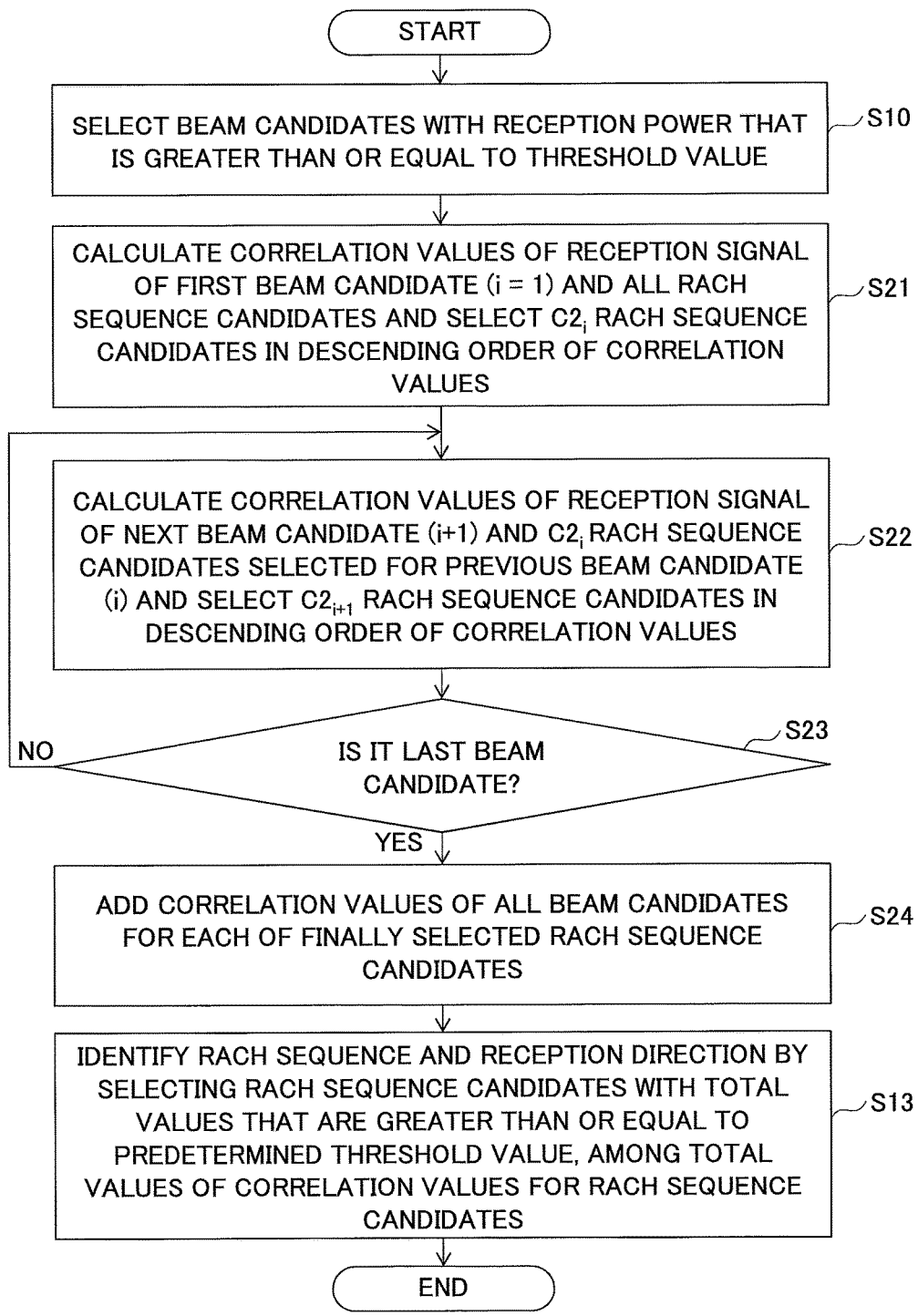
FIG. 12 is a flowchart illustrating an example of a processing procedure for specifying an RACH sequence and a reception direction (a second modified example)

FIG. 12 is a flowchart illustrating an example of a processing procedure of specifying the RACH sequence and the reception direction (a second modified example). In FIG. 12, i=1 to C0'. Also, the reception directions which are actually indicated by the beam candidates (1 to CO') can be arbitrarily associated. The processing procedure of step S10 and the processing procedure of step S13 are the same as the processing procedures of step S10 in FIG. 10 and step S13 in FIG. 6, respectively, and thus description thereof is omitted. Since the processing procedure of step S10 corresponds to the process of narrowing down the beam candidate in advance using the reception power, a case where an increase in the calculation amount may be omitted.

In step S21, the identifier 104 performs the reception beam forming by multiplying the RACH signal received by the signal receiver 102 by a weight ($W_1$) corresponding to a first beam candidate (1). Then, the identifier 104 calculates the correlation value ($\rho$) between the RACH signal of the beam candidate (1) (the RACH signal multiplied by the weight W1) and each of the C1 RACH sequence candidates, and selects a predetermined number of RACH sequence candidates ($C2_1$ RACH sequence candidates) in the descending order of the correlation values.

In step S22, the identifier 104 performs the reception beam forming by multiplying the RACH signal received by the signal receiver 102 by a weight ($W_2$) corresponding to a next beam candidate (2). Then, the identifier 104 calculates the correlation value ($\rho$) between the RACH signal of the beam candidate (2) and each of the $C2_1$ RACH sequence candidates selected by the first beam candidate (1), and selects a predetermined number of RACH sequence candidates ($C2_2$ RACH sequence candidates) in the descending order of the correlation values. Here, $C2_2 < C2_1$. In other words, the identifier 104 selects the RACH sequence so that the RACH sequence candidates are gradually narrowed down in the beam candidate order. Any value may be set as a value of ($C2_i$ for each beam candidate (i). For example, a setting is performed such that a value of C2 decreases in the beam candidate order, for example, if the number of beam candidates is 5, and the number of RACH sequence candidates is 100, ($C2_1$ for the beam candidate (1) is 50, ($C2_2$ for the beam candidate (2) is 40, $C2_3$ for the beam candidate (3) is 30, ($C2_4$ for the beam candidate (4) is 20, and ($C2_5$ for the beam candidate (5) is 10. Then, the identifier 104 repeats the processing procedure of step S22 in the order of the CO' beam candidates (S23).

In step S24, the identifier 104 adds the correlation values between the finally selected ($C2_{CO'}$ RACH sequence candidates and all the (Co') beam candidates. For example, it is assumed that the number of beam candidates is 5, and the RACH sequence candidates of $S_{10}$, $S_{20}$, and $S_{30}$ have been selected when processing of the last beam candidate (5) is completed. In this case, the identifier 104 adds the correlation values of the beam candidates (1 to 5) and the RACH sequence candidate ($S_{10}$). Similarly, the correlation values of the beam candidates (1 to 5) and the RACH sequence candidate ($S_{20}$) are added, and the correlation values of the beam candidates (1 to 5) and the RACH sequence candidate ($S_{30}$) are added.

A specific example of the processing procedure according to the second modified example is described with reference to FIG. 13A and FIG. 13B. Points which are not particularly mentioned may be the same as in FIG. 9.

Figure 13A:
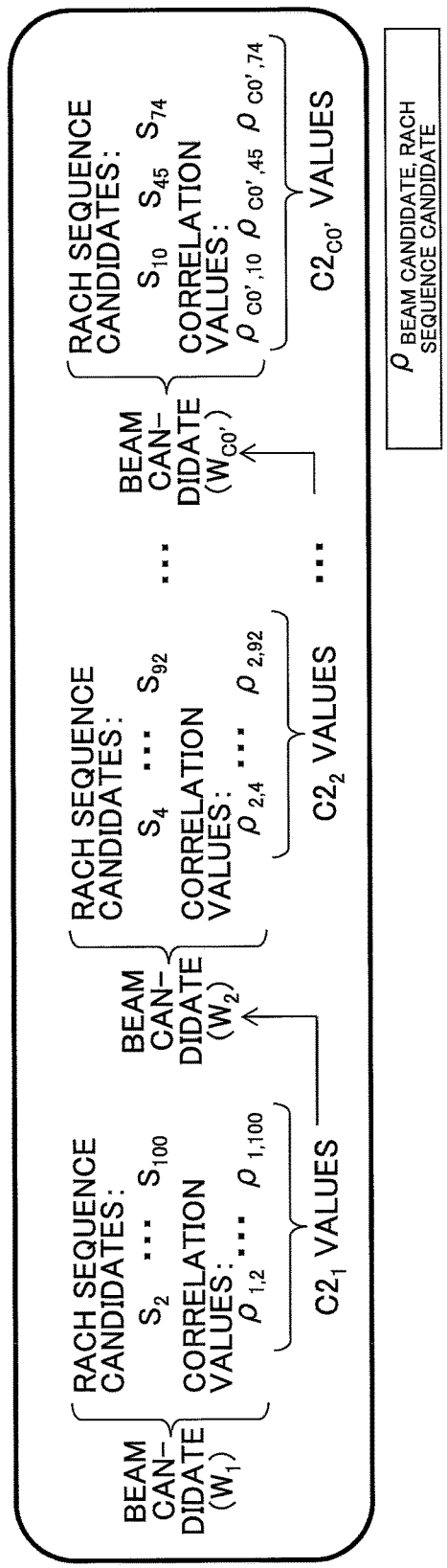
FIG. 13A is a diagram for describing a specific example of a processing procedure for specifying a RACH sequence and a reception direction (the second modified example)

Through the processing procedure of steps S21 to S23, ($C2_{CO'}$ RACH sequence candidates are selected at the time of the last beam candidate $W_{CO'}$ as illustrated in FIG. 13A. In the example of FIG. 13A, it is assumed that ($C2_{CO'}$ is 3, and the RACH sequence candidates ($S_{10}$, $S_{45}$, and $S_{74}$) are finally selected.

Figure 13B:
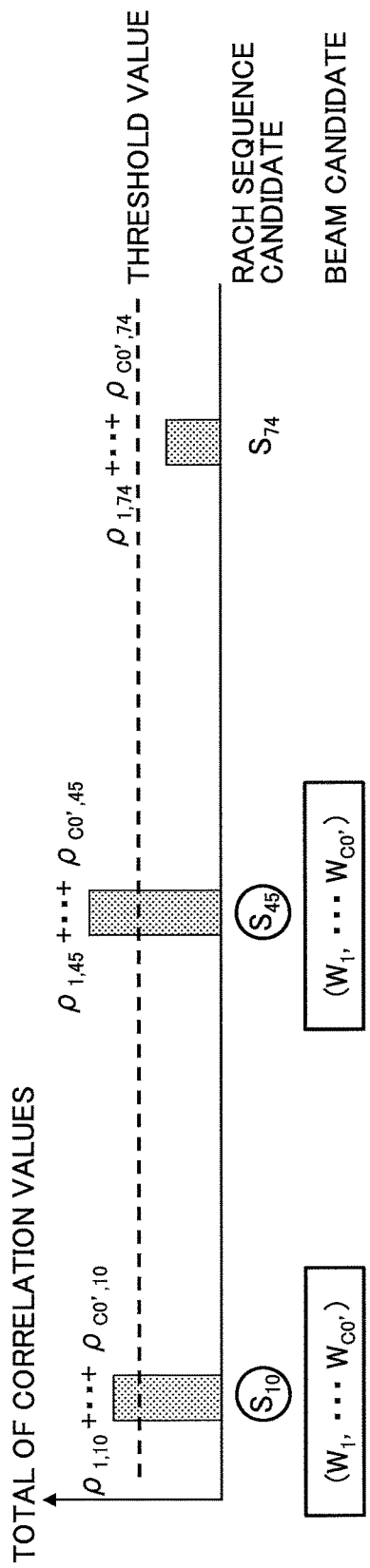
FIG. 13B is a diagram for describing the specific example of the processing procedure for specifying the RACH sequence and the reception direction (the second modified example).

Then, through the processing procedure of step S24, all correlation values $\rho_{1,10}$ to $\rho_{CO',10}$ between the beam candidates (1 to C0') and the RACH sequence candidate ($S_{10}$) are added as illustrated in FIG. 13B. Similarly, all correlation values $\rho_{1,45}$ to $\rho_{CO',45}$ between the beam candidates (1 to C0') and the RACH sequence candidate ($S_{45}$) are added, and all correlation values $\rho_{1,74}$ to $\rho_{CO',74}$ between the beam candidates (1 to CO') and the RACH sequence candidate ($S_{74}$) are added.

Then, the RACH sequence candidate with a sum of the correlation values that is greater than or equal to a predetermined threshold value (X is selected in the processing procedure of step S13. In the example of FIG. 13B, the RACH sequence candidates in which the sum of correlation values is a predetermined threshold value (X) or more are $S_{10}$ and $S_{45}$. Therefore, the identifier 104 identifies two RACH sequence candidates ($S_{10}$ and $S_{45}$) as the RACH sequences received from a plurality of mobile stations 4.

In the second modified example, the correlation values of all the CO' beam candidates are added for the two specified RACH sequences ($S_{10}$ and $S_{45}$). Therefore, the identifier 104 identifies that the reception directions of the RACH signals which are the RACH sequences ($S_{10}$ and $S_{45}$) are the direction of all the CO' beam candidates. Further, instead of specifying all the CO' beam candidates as the reception direction, the identifier 104 may limit the reception direction to some beam candidates. For example, the identifier 104 may select a predetermined number of beam candidates in the descending order of the correlation values for each specified RACH sequence and specify the selected beam candidates as the reception direction. Further, the identifier 104 may specify the beam candidate in which the correlation value with the specified RACH sequence is a predetermined threshold value (Z) or more as the direction in which the RACH signal of the specified RACH sequence is received.

According to the second modified example described above, in the present embodiment, it is possible to perform the process of specifying the RACH sequence and the reception direction of the RACH signal in various methods.

<Conclusion>

As described above, according to the embodiment, there is provided a base station of a radio communication system including the base station and one or more mobile stations that communicate with the base station, the base station including a receiver that receives, from each of the one or more mobile stations, a signal of a specific random access sequence of a plurality of random access sequences; and an identifier that identifies the specific random access sequence of the plurality of random access sequences and a receiving direction in which the signal of the specific random access sequence is received, based on absolute values of a plurality of total values, each of the plurality of total values being obtained by calculating correlation values for combinations between signals in a respective plurality of reception directions to which weights corresponding to the plurality of reception directions are applied and the plurality of random access sequences, and by adding the correlation values for the combinations corresponding to one random access sequence of the plurality of random access sequences. According to the base station 1, a technique is provided that allows the sequence of the RACH signal and the reception direction of the RACH signal to be identified in the random access procedure.

Further, the signals in the plurality of reception directions to which the weights corresponding to the plurality of reception directions are applied may be signals of the plurality of reception directions with reception power that is greater than or equal to a predetermined threshold value. As a result, the calculation amount in the process of identifying the RACH sequence and the reception direction of the RACH signal can be reduced, and the RACH sequence and the reception direction of the RACH signal can be quickly identified.

Further, the identifier may identify the specific random access sequence of the plurality of random access sequences and the reception direction in which the signal of the specific random access sequence is received by determining whether, for each of the total correlation values obtained by adding the correlation values for the combinations corresponding to the one random access sequence of the plurality of random access sequences, the absolute value of the total value is greater than or equal to a predetermined threshold value. The base station 1 can identify the random access sequence of the signal transmitted from the mobile station 4.

Further, the identifier may identify the specific random access sequence of the plurality of random access sequences and the reception direction in which the signal of the specific random access sequence is received by selecting a predetermined number of random access sequences in a descending order of the absolute values of the total values among the plurality of total values, each of the plurality of total values being obtained by adding the correlation values for the combinations corresponding to the one random access sequence of the plurality of random access sequences. As a result, the base station 1 can identify the random access sequence of the signal transmitted from the mobile station 4.

Further, the identifier may calculate correlation values for combinations of a signal in a predetermined reception direction among the signals in the plurality of reception directions to which the weights corresponding to the plurality of reception directions are applied and the plurality of random access sequences; may narrow down random access sequence candidates by sequentially repeating, for the signal in each reception direction of the plurality of reception directions, a process of selecting a predetermined number of random access sequences in the descending order of the correlation values among the correlation values for the combinations; and may identify the specific random access sequence among the plurality of random access sequences and the reception direction in which the signal of the specific random access sequence is received based on absolute values of total values, each of the total values being obtained by adding the correlation values corresponding to one random access sequence candidate of the narrowed random access sequence candidates. As a result, the base station 1 can identify the random access sequence of the signal transmitted from the mobile station 4 by performing the processes sequentially.

Further, each of the plurality of reception directions may be a corresponding reception direction of a plurality of reception directions defined by equally dividing a signal reception plane at the base station in a horizontal direction and a vertical direction at angles having predetermined intervals. As a result, the direction can be defined in advance in which the beam forming is performed.

Furthermore, the receiver may store the signal of the specific random access sequence received from each of the one or more mobile stations in a storage unit, and the identifier may generate the signals in the plurality of reception directions to which the weights corresponding to the plurality of reception directions are applied by multiplying the signal of the specific random access sequence received from each of the one or more mobile stations and stored in the storage unit by the weights corresponding to the plurality of reception directions. As a result, the base station 1 can identify the random access sequence and the reception direction of the signal received from the mobile station 4 through digital signal processing. Further, the mobile station 4 can transmit the RACH signal without recognizing the direction of the beam in which the reception beam forming is performed.

<Supplement of Embodiment>

The configurations of the devices (the base station 1) described above in the embodiment of the present invention may be implemented such that a program is executed by a CPU (processor) in a device having the CPU and a memory, may be a configuration implemented by hardware such as a hardware circuit equipped with a processing logic described in the present embodiment, or may be a combination of a program and hardware.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the invention, specific numerical value examples are used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the sequences and the flowcharts described in the embodiment, the order may be changed as long as there is no inconsistency. For the sake of convenience of description, the base station 1 has been described using the functional block diagrams, but such devices may be implemented by hardware, software, or a combination thereof. Software executed by the processor included in the base station 1 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In the embodiment, the signal receiver 102 is an example of a receiving unit. The RACH sequence is an example of a random access sequence.

This international patent application is based upon and claims the benefit of priority of Japanese Patent Application No. 2016-048756 filed on Mar. 11, 2016, and the entire contents of Japanese Patent Application No. 2016-048756 are incorporated herein by reference.

EXPLANATIONS OF LETTERS OR NUMERALS 1, 2 base station
3 central control station
4 mobile station
101 signal transmitter
102 signal receiver
103 reception power measuring unit
104 identifier
201 RF module
202 BB processing module
203 device control module
204 communication IF

The invention claimed is:
1. A base station of a radio communication system including the base station and one or more mobile stations that communicate with the base station, the base station comprising:
a receiver that receives, from each of the one or more mobile stations, a signal of a specific random access sequence of a plurality of random access sequences; and
an identifier that identifies the specific random access sequence of the plurality of random access sequences and a receiving direction in which the signal of the specific random access sequence is received, based on absolute values of a plurality of total values, each of the plurality of total values being obtained by calculating correlation values for combinations between signals in a respective plurality of reception directions to which weights corresponding to the plurality of reception directions are applied and the plurality of random access sequences, and by adding the correlation values for the combinations corresponding to one random access sequence of the plurality of random access sequences.

2. The base station according to claim 1, wherein the signals in the plurality of reception directions to which the weights corresponding to the plurality of reception directions are applied are signals of the plurality of reception directions with reception power that is greater than or equal to a predetermined threshold value.

3. The base station according to claim 1, wherein the identifier identifies the specific random access sequence of the plurality of random access sequences and the reception direction in which the signal of the specific random access sequence is received by determining whether, for each of the total correlation values obtained by adding the correlation values for the combinations corresponding to the one random access sequence of the plurality of random access sequences, the absolute value of the total value is greater than or equal to a predetermined threshold value.

4. The base station according to claim 1, wherein the identifier identifies the specific random access sequence of the plurality of random access sequences and the reception direction in which the signal of the specific random access sequence is received by selecting a predetermined number of random access sequences in a descending order of the absolute values of the total values among the plurality of total values, each of the plurality of total values being obtained by adding the correlation values for the combinations corresponding to the one random access sequence of the plurality of random access sequences.

5. The base station according to claim 1, wherein the identifier calculates correlation values for combinations of a signal in a predetermined reception direction among the signals in the plurality of reception directions to which the weights corresponding to the plurality of reception directions are applied and the plurality of random access sequences; narrows down random access sequence candidates by sequentially repeating, for the signal in each reception direction of the plurality of reception directions, a process of selecting a predetermined number of random access sequences in the descending order of the correlation values among the correlation values for the combinations; and identifies the specific random access sequence among the plurality of random access sequences and the reception direction in which the signal of the specific random access sequence is received based on absolute values of total values, each of the total values being obtained by adding the correlation values corresponding to one random access sequence candidate of the narrowed random access sequence candidates.

6. The base station according to claims 1, wherein each of the plurality of reception directions is a corresponding reception direction of a plurality of reception directions defined by equally dividing a signal reception plane at the base station in a horizontal direction and a vertical direction at angles having predetermined intervals.

7. The base station according to claim 1, wherein the receiver stores the signal of the specific random access sequence received from each of the one or more mobile stations in a storage unit, and the identifier generates the signals in the plurality of reception directions to which the weights corresponding to the plurality of reception directions are applied by multiplying the signal of the specific random access sequence received from each of the one or more mobile stations and stored in the storage unit by the weights corresponding to the plurality of reception directions.

* * * * *